United States Patent Office 3,704,167

Patented Nov. 28, 1972

3,704,167

PROCESS FOR MANUFACTURING PHOTOGRAPHIC FILM HAVING A MAGNETIC RECORDING STRIPE

Nobuo Yamamoto and Hideo Kawaguchi, Kanagawa, Japan, assignors to Fuji Photo Film Co., Ltd., Kanagawa, Japan No Drawing. Filed June 11, 1971, Ser. No. 152,423
Claims priority, application Japan, June 11, 1970, 45/50,563
Int. Cl. H01f *10/00;* G03c *1/84*
U.S. Cl. 117—239 18 Claims

ABSTRACT OF THE DISCLOSURE

An improvement in a process for manufacturing a photographic film with a magnetic recording stripe wherein a dispersion of magnetic material is coated on an antihalation layer of the light-sensitive photographic film using as the support polyethylene terephthalate. The improvement comprises either adding a compound having at least two aziridine rings into the dispersion and then coating the dispersion on the antihalation layer, or by first treating the antihalation layer with a solution containing a compound having at least two aziridine rings and then coating the dispersion on the antihalation layer thus obtained.

BACKGROUND OF THE INVENTION

(1) Field of the invention

The present invention relates to a method for preparing a photographic film having a magnetic recording stripe. More particularly, this invention relates to a method for providing a light-sensitive photographic film wtih a sound track.

(2) Description of the prior art

Two kinds of methods have been known for providing cinefilms with a sound track, i.e., one being an optical one and the other being using a magnetic recording medium, while the present invention is concerned with the latter method by magnetic recording medium. In the previous methods for providing cinefilms with a magnetic stripe, a dispersion of a magnetic material is locally applied to the film after the cinefilm was photographed and developed. Such methods are accompanied by, however, such a disadvantage that since the sound recording is conducted after the image was recorded it is impossible to record the sound and the image simultaneously. In a view to eliminate such a disadvantage, i.e., enabling simultaneously the recording of image and sound, "light-sensitive cinefilms already provided with a magnetic recording stripe" have been desired.

Furthermore, on the back layer of the cinefilms is provided, in general, an antihalation layer, which is readily dissolved by alkaline developing treatment.

In order to provide a magnetic stripe on the light-sensitive cinefilms, it is necessary that the dispersion of the magnetic material be applied onto the alkali-soluble antihalation layer. However, when the normally employed dispersion of the magnetic material, as such, is applied onto the antihalation layer, the magnetic layer will be readily removed together with the antihalation layer by the alkaline developing treatment and therefore will not be left on the film.

SUMMARY OF THE INVENTION

The present invention is thus concerned with a method for firmly adhering a magnetic stripe to a film by preventing the antihalation layer at the area bearing the magnetic stripe from being removed by photographic processings.

In accordance with the present invention, it has been found that, when the magnetic stripe is provided locally on a light-sensitive cinefilm by either applying to the antihalation layer a dispersion of magnetic material containing therein a compound having at least two aziridine rings or by treating the area of the antihalation layer to be provided with the magnetic stripe with a solution containing the compound, the magnetic stripe thus provided to the antihalation layer adheres thereto after the cinefilm is subjected to development in an alkaline developer.

DETAILED DESCRIPTION OF THE INVENTION

More specifically, in accordance with the present invention, it has been found that the present method is particularly effectively practiced when used to provide the magnetic stripe on an antihalation layer of a film wherein a polyethylene terephthalate film is employed as the support, a mixture of a cellulose ester and a polyester is employed as the undercoat and a copolymer of maleic anhydride or a dicarboxylic acid ester of cellulose is used as the binder for the anti-halation layer. The above-described copolymers of maleic anhydride include, by way of example, those of maleic anhydride with styrene, styrene derivatives, vinyl acetate, alkyl acrylates having from 1 to 4 carbon atoms, or alkyl methacrylates having from 1 to 4 carbon atoms.

The dicarboxylic acid esters of cellulose include, by way of example, cellulose acetate phthalate, cellulose acetate maleate, cellulose acetate succinate and cellulose acetate propionate phthalate.

The fact that the antihalation layer becomes insoluble in an alkaline developer when the compound having aziridine rings is added into a dispersion of a magnetic material followed by the application thereof to the antihalation layer or the area of the antihalation layer to be coated with the magnetic stripe is treated with the solution containing said compound having aziridine rings appears to result from diffusion and penetration of so applied aziridine ring-containing compounds into the antihalation layer to cause the reaction wtih the carboxyl groups in the binder, thereby to construct a two- or three-dimensional net structure in the binder. The compound having only one aziridine ring cannot form any net structure, so that they cannot adhere the magnetic layer to the antihalation layer without dissolving the antihalation layer into the alkaline developing solution.

Examples of compounds having more than one aziridine ring are as follows:

Compound I

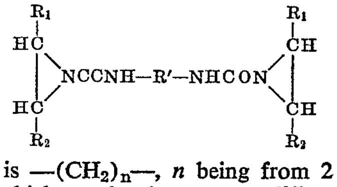

wherein R′ is $—(CH_2)_n—$, *n* being from 2 to 12, and $R_1$ and $R_2$, which can be the same or different, are each hydrogen, a methyl or an ethyl group.

Compound II

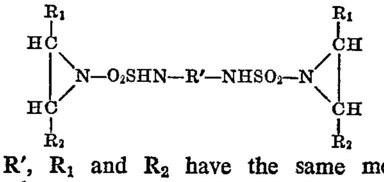

wherein R′, $R_1$ and $R_2$ have the same meaning as described above.

Compound III

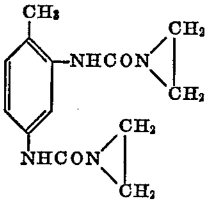

Compound IV

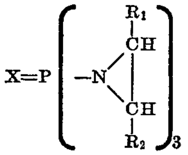

wherein X represents an oxygen or sulfur atom and $R_1$ and $R_2$ have the same meaning as described above.

Compound V

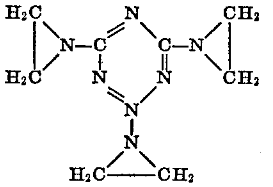

Compound VI

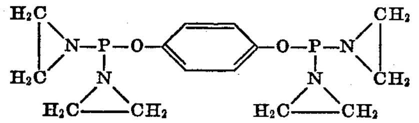

Compound VII

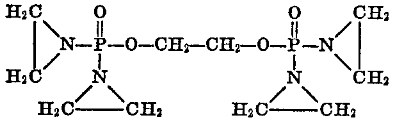

The amount of the compound having aziridine rings added depends upon the nature of the specific compound having aziridine rings and the solvent for the dispersion of the magnetic material, although from 0.05 to 8% by weight based on the dispersion of the magnetic material is preferred.

In the case of treating, prior to applying the magnetic layer, the antihalation layer, it is desirable to effect the treatment by use of a solution containing from 0.05 to 10% by weight of the compound having aziridine rings.

The dispersion of magnetic materials herein used may be any of those normally employed for providing "developed cinefilms" with a magnetic sound track.

Furthermore, when treating with solutions containing the compound having aziridine rings, there may be employed, as the solvents therefor, alcohols such as methanol, ethanol and propanol, ketones such as acetone, methyl ethyl ketone and cyclohexanone, esters such as methyl acetate, ethylacetate and butylacetate, chlorinated hydrocarbons such as methylene chloride, ethylene dichloride and trichloroethylene, methyl Cellosolve, ethyl Cellosolve, tetrahydrofuran, dioxane, dimethylformamide or suitable combinations thereof.

The examples following are merely illustrative and should not be construed as limiting the scope of the present invention.

EXAMPLE 1

Using a light-sensitive cinefilm wherein a mixture of a polyester resulting from the polycondensation between terephthalic acid and ethylene glycol and a cellulose ester was applied, as disclosed in Japanese Pat. No. 532,007, onto a biaxially stretched crystalline polyethylene terephthalate film to prepare an undercoat on which an antihalation layer using as the binder a copolymer of maleic anhydride with styrene was present. A dispersion of a magnetic material having the following composition was applied to a definite narrow area of said antihalation layer followed by drying at a temperature of 40° C. for 3 minutes.

| | Parts by weight |
|---|---|
| Nitrocellulose | 10 |
| Iron oxide | 30 |
| Dibutyl phthalate | 5 |
| Methanol | 5 |
| Butyl acetate | 30 |
| Ethyl Cellosolve | 20 |
| Compound IV wherein X is an oxygen atom and $R_1$ and $R_2$ are each hydrogen | 0.5 |

The resulting cinefilm having coated thereon the magnetic stripe was subjected to a normal color developing treatment, but the magnetic stripe underwent no separation and was firmly adhered to the support. On the other hand, when no Compound IV was added, the magnetic stripe underwent separation during development.

EXAMPLE 2

Using a cinefilm having a similar antihalation layer to that used in Example 1, the antihalation layer at the area to be coated later with a magnetic stripe was treated with a solution having the composition as described below, followed by drying at a temperature of 40° C. for 3 minutes.

| | Parts by weight |
|---|---|
| Nitrocellulose | 2 |
| Acetone | 20 |
| Methanol | 15 |
| Methyl Cellosolve | 40 |
| Isoamyl acetate | 30 |
| Compound I wherein R′ is $-(CH_2)_6-$ and $R_1$ and $R_2$ are each hydrogen | 0.3 |

Subsequently, a dispersion of magnetic material having the composition as described below was applied and dried at a temperature of 40° C. for 3 minutes.

| | Parts by weight |
|---|---|
| Vinyl chloride/vinyl acetate co-polymer (trademark, Vinylite) | 7 |
| Epoxy resin | 5 |
| Iron oxide | 30 |
| Methyl ethyl ketone | 30 |
| Toluene | 30 |
| Ethyl Cellosolve | 10 |

The resulting film having coated thereon the magnetic stripe was subjected to an alkaline developing treatment, whereafter it was projected 200 times repeatedly by use of a projector equipped with a magnetic reproducing unit, unaccompanied by the damage to the magnetic stripe.

EXAMPLE 3

Using a light-sensitive cinefilm wherein an antihalation layer is present, using as the binder cellulose acetate phthalate, on the same undercoat as described in Example 1, the antihalation layer was treated at the area to be coated with a magnetic stripe with a solution having the composition as described below, followed by drying at a temperature of 40° C. for 2 minutes.

| | Parts by weight |
|---|---|
| Methanol | 20 |
| Butyl acetate | 40 |
| Methyl Cellosolve | 40 |
| Compound V | 0.2 |

Onto the thus treated surface was applied a dispersion of a magnetic material having the following composition, followed by drying at a temperature of 50° C. for 3 minutes.

| | Parts by weight |
|---|---|
| Nitrocellulose | 10 |
| Iron oxide | 30 |
| Nitrile rubber | 3 |
| Isoamyl acetate | 20 |
| Cellosolve acetate | 20 |

The resulting film was immersed in an alkaline developing solution for 15 minutes, but the magnetic stripe was firmly adhered thereto, without undergoing any separation therefrom.

EXAMPLE 4

Using a cinefilm having a similar antihalation layer to that used in Example 1, the antihalation layer was coated locally thereon with a dispersion of a magnetic material having the following composition with subsequent drying at a temperature of 50° C. for 3 minutes.

| | Parts by weight |
|---|---|
| Nitrocellulose | 10 |
| Iron oxide | 30 |
| Dibutyl phthalate | 5 |
| Butyl acetate | 30 |
| Ethyl Cellosolve | 20 |
| Methanol | 5 |
| Compound III | 0.2 |

The resulting film was subjected to a conventional color development and then tested by projecting the same over 200 times in succession by use of a projector with a magnetic reproducing unit, while no injury or damage was observed in the magnetic stripe.

Although the invention has been described in considerable detail with reference to certain preferred embodiments thereof, it will be understood that variations and modifications can be effected without departing from the spirit and scope of the invention, as described hereinabove, and defined in the appended claims.

What is claimed is:

1. In a process for manufacturing a light-sensitive photographic film with a magnetic recording stripe by coating a dispersion of magnetic material locally on an antihalation layer on the back side of a light-sensitive photographic film using as the support a polyethylene terephthalate film, the improvement which comprises adding a compound having at least two aziridine rings to said dispersion of magnetic material before coating.

2. In a process for manufacturing a light-sensitive photographic film with a magnetic recording stripe by coating a dispersion of magnetic material locally on an antihalation layer of the light-sensitive photographic film using as the support a polyethylene terephthalate film, the improvement which comprises treating said antihalation layer at the area to be coated with the magnetic stripe with a solution containing a compound having at least two aziridine rings and then coating said dispersion on the antihalation layer thus treated.

3. The process according to claim 1, wherein said compound is of the general formula:

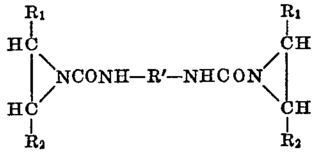

wherein R′ is $-(CH_2)_n-$, $n$ being from 2 to 16, and $R_1$ and $R_2$ which may be the same or different, each represents a hydrogen atom, a methyl group or an ethyl group.

4. The process according to claim 1, wherein said compound is of the general formula:

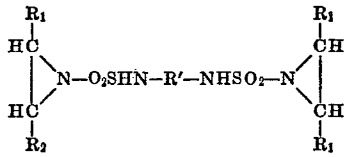

wherein R′ is $-(CH_2)_n-$, $n$ being from 2 to 16, and $R_1$ and $R_2$, which may be the same or different, each represents a hydrogen atom, a methyl group or an ethyl group.

5. The process according to claim 1, wherein said compound is of the formula:

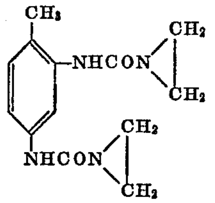

6. The process according to claim 1, wherein said compound is of the general formula:

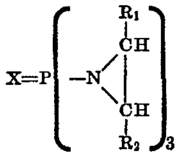

wherein X is an oxygen atom or a sulfur atom and $R_1$ and $R_2$, which may be the same or different, each represents a hydrogen atom, a methyl group or an ethyl group.

7. The process according to claim 1, wherein said compound is of the formula:

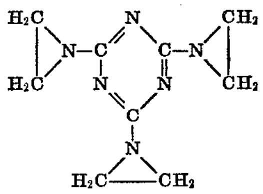

8. The process according to claim 1, wherein said compound is of the formula:

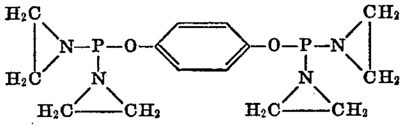

9. The process according to claim 1, wherein said compound is of the formula:

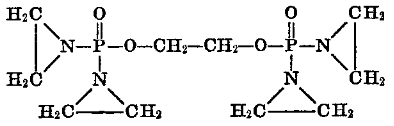

10. The process according to claim 2, wherein said compound is of the general formula:

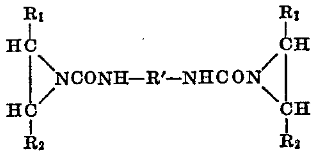

wherein R′ is $-(CH_2)_n-$, $n$ being from 2 to 16, and $R_1$ and $R_2$ which may be the same or different, each represents a hydrogen atom, a methyl group or an ethyl group.

11. The process according to claim 2, wherein said compound is of the general formula:

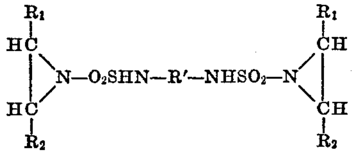

wherein R' is —$(CH_2)_n$—, $n$ being from 2 to 16, and $R_1$ and $R_2$, which may be the same or different, each represents a hydrogen atom, methyl group or an ethyl group.

12. The process according to claim 2, wherein said compound is of the formula:

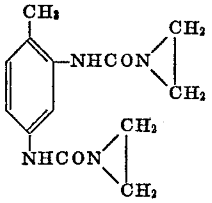

13. The process according to claim 2, wherein said compound is of the general formula:

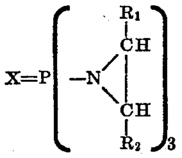

wherein X is an oxygen atom or a sulfur atom and $R_1$ and $R_2$, which may be the same or different, each represents a hydrogen atom, a methyl group or an ethyl group.

14. The process according to claim 2, wherein said compound is of the formula:

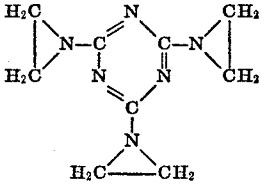

15. The process according to claim 2, wherein said compound is of the formula:

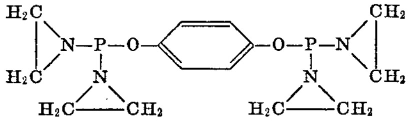

16. The process according to claim 2, wherein said compound is of the formula:

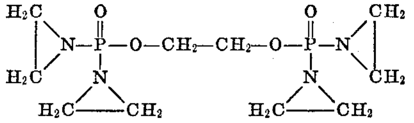

17. The process according to claim 1, wherein the amount of said compound in said dispersion is from 0.05 to 8% by weight, based on the dispersion weight.

18. The process according to claim 2, wherein the amount of said compound in said solution is from 0.05 to 10% by weight, based on the weight of the solution.

References Cited

UNITED STATES PATENTS

| | | | |
|---|---|---|---|
| 2,886,538 | 5/1959 | Chance | 117—136 X |
| 2,901,444 | 8/1959 | Chance | 117—136 X |
| 3,179,547 | 4/1965 | Kigane et al. | 117—76 X |
| 3,258,258 | 6/1966 | Cohen | 117—136 X |
| 3,312,520 | 4/1967 | Kenaga | 117—136 X |
| 3,220,843 | 11/1965 | Louick et al. | 117—240 X |
| 3,227,555 | 1/1966 | Van Norman | 117—235 X |
| 3,455,727 | 7/1969 | Dye | 117—76 |

FOREIGN PATENTS

| | | | |
|---|---|---|---|
| 771,115 | 11/1967 | Canada | 117—235 |

WILLIAM D. MARTIN, Primary Examiner
B. D. PIANALTO, Assistant Examiner

U.S. Cl. X.R.

96—84 R; 117—76 F